(12) United States Patent
Roschelle et al.

(10) Patent No.: US 6,628,918 B2
(45) Date of Patent: Sep. 30, 2003

(54) SYSTEM, METHOD AND COMPUTER PROGRAM PRODUCT FOR INSTANT GROUP LEARNING FEEDBACK VIA IMAGE-BASED MARKING AND AGGREGATION

(75) Inventors: Jeremy Roschelle, Palo Alto, CA (US); Philip Vahey, San Francisco, CA (US); Tristan De Fronderville, San Anselmo, CA (US)

(73) Assignee: SRI International, Inc., Menlo Park, CA (US)

( * ) Notice: Subject to any disclaimer, the term of this patent is extended or adjusted under 35 U.S.C. 154(b) by 0 days.

(21) Appl. No.: 09/792,160

(22) Filed: Feb. 21, 2001

(65) Prior Publication Data

US 2002/0115050 A1 Aug. 22, 2002

(51) Int. Cl.⁷ .................................................. G09B 7/00
(52) U.S. Cl. .................... 434/350; 434/362; 434/322; 434/323; 455/2.01; 705/10; 725/24
(58) Field of Search ................................ 434/350, 362, 434/322, 323; 455/2.01; 705/10; 725/24

(56) References Cited

U.S. PATENT DOCUMENTS

| | | | | | |
|---|---|---|---|---|---|
| 4,764,120 A | * | 8/1988 | Groffin et al. | .......... | 434/336 X |
| 5,002,491 A | * | 3/1991 | Abrahamson et al. | .. | 434/322 X |
| 5,273,437 A | * | 12/1993 | Caldwell et al. | ......... | 434/351 X |
| 5,465,384 A | * | 11/1995 | Bejan et al. | ................ | 455/2 X |
| 5,727,950 A | * | 3/1998 | Cook et al. | ................. | 434/350 |
| 5,823,788 A | * | 10/1998 | Lemelson et al. | ....... | 434/350 X |
| 6,052,512 A | * | 4/2000 | Peterson et al. | ........ | 709/220 X |
| 6,070,145 A | * | 5/2000 | Pinsley et al. | ............ | 705/10 X |
| 6,074,216 A | * | 6/2000 | Cueto | ..................... | 434/322 X |
| 6,099,319 A | * | 8/2000 | Zaltman et al. | ............. | 434/236 |
| 6,155,840 A | * | 12/2000 | Sallette | .................... | 434/323 X |
| 6,195,687 B1 | * | 2/2001 | Greaves et al. | ......... | 709/208 X |
| 6,208,832 B1 | * | 3/2001 | Remschel | ............... | 434/350 X |
| 6,250,930 B1 | * | 6/2001 | Mintz | ..................... | 434/323 X |
| 6,287,125 B1 | * | 9/2001 | Dorcely | ................... | 434/323 X |
| 6,289,222 B1 | * | 9/2001 | Cue et al. | ............... | 434/458 X |
| 6,302,698 B1 | * | 10/2001 | Ziv-El | ..................... | 434/323 X |
| 6,325,632 B1 | * | 12/2001 | Chao et al. | ............. | 434/322 X |
| 6,356,939 B1 | * | 3/2002 | Dahl | ...................... | 709/209 X |
| 6,377,781 B1 | * | 4/2002 | Mishkin | ................. | 434/350 X |
| 6,381,444 B1 | * | 4/2002 | Aggarwal et al. | ...... | 434/350 X |
| 6,397,036 B1 | * | 5/2002 | Thean et al. | ............ | 434/350 X |
| 6,449,632 B1 | * | 9/2002 | David et al. | ............ | 709/202 X |

* cited by examiner

*Primary Examiner*—S. Thomas Hughes
*Assistant Examiner*—Chanda L. Harris
(74) *Attorney, Agent, or Firm*—Moser, Patterson & Sheridan, LLP.; Kin-Wah Tong, Esq.

(57) ABSTRACT

A system, method and computer program product are provided for giving feedback in an educational environment using networked devices. Initially, an image stimulus is displayed to a plurality of individual group members regarding material being presented by a group leader utilizing a plurality of networked devices operated by the group members. Thereafter, feedback is received from the individual group members in response to the image stimulus utilizing the networked devices. The feedback is then aggregated after which the aggregated feedback is transmitted to the networked device operated by the group leader. Such aggregated feedback reflects the feedback received from each of the individual group members for allowing the group leader to view the aggregated feedback.

83 Claims, 7 Drawing Sheets

SYSTEM, METHOD AND COMPUTER PROGRAM PRODUCT FOR INSTANT GROUP LEARNING FEEDBACK VIA IMAGE-BASED MARKING AND AGGREGATION

FIELD OF THE INVENTION

The present invention relates to networked devices, and more particularly to improving educational environments using networked devices.

BACKGROUND OF THE INVENTION

Good teachers often "take the pulse" of their classrooms by checking how attentive their students are, or by asking students to raise their hands. While this is quick, easy, and cheap, it only works for certain kinds of information. In particular, while seating in a typical classroom configuration, it is hard to indicate a spatial position in a projected image verbally, or with a quick gesture.

In a similar way, students have very few means in ordinary classrooms to gauge their understanding relative to their fellow students. In particular, students may have infrequent opportunities to see how they answered a question relative to their fellow students.

Existing technology-based classroom assessment systems are based upon simple stimulus and response types. Typically, responses are either multiple choice or numeric. Moreover, existing systems show summary data in a form different from that which the student generated the response. For instance, student multiple choices appear on their screen as separate radio buttons, but appear on the summary display in a histogram. An example of such systems is ClassTalk, a product that utilizes Texas Instruments (TI) calculators. There are also many systems to allow people in a room to vote, and have poll results instantly tabulated. Finally, there are classroom groupware systems in which students can collaboratively add ideas to a database, or control parts of a simulation; these systems are not quick and easy to use in the course of ordinary classroom activities, but for the most part, demand major changes in the teaching approach.

Educational stakeholders increasingly demand accountability for use of technology in classrooms. Moreover, ample research shows that teachers teach better and students learn better when there is rapid feedback about the students' current state of comprehension or understanding. There is thus a need for a system that provides a quick, easy, meaningful way for teachers to "take the pulse of their students" and for students to see how their current understanding relates to their peer's understanding.

DISCLOSURE OF THE INVENTION

A system, method and computer program product are provided for giving feedback in an educational environment using networked devices. Initially, the group leader selects a 2 or 3D image stimulus, and indicates their selection to a server computer. This image is then displayed to a plurality of individual group members utilizing a plurality of networked devices operated by the group members, and, optionally, made visible on one or more additional displays, such as a projected display Using their networked device, each individual group member then indicates one or more marks or annotations on the image stimulus image in the form of feedback, which constitute that member's response. These responses may include points, lines, shapes, and many other forms of annotation, as well as additional attributes further specifying the response.

Thereafter, a server computer receives this response from the individual group members utilizing the network between the devices and the server computer. The responses of all group members are then aggregated, by superimposing the response marks or annotations on the image stimulus image. Optionally, additional processing may be performed, which may sort, filter, color, scale, label, replace, or otherwise transform the aggregated responses before composing them with the image stimulus image. The server computer then makes the composed image available for viewing by the group leader and/or group members, utilizing one or more of the display devices available to the leader and members.

In one embodiment of the present invention, the networked devices may include thin client devices. Further, such thin client devices may include wireless devices. Still yet, the wireless devices may include hand-held wireless devices such as personal digital assistants (PDAs) each including a stylus.

In another embodiment of the present invention, the aggregated feedback may keep the identity of the individual group members secret. Further, the aggregated feedback may be transmitted to the networked devices operated by the individual group members. In another aspect, the feedback may be received from the individual group members only after the feedback is entered by the individual group members, and the feedback is subsequently authorized for transmission.

As an option, the image stimulus may include a plurality of sequentially displayed frames of images, i.e. a movie. Further, the aggregated feedback may be stored for display utilizing the Internet. This may be done for allowing other interested members to review the feedback.

In still another embodiment of the present invention, the group leader may be allowed to select at least one of a plurality of summary types. The feedback may thus be aggregated based on the selected summary type. Further, the feedback may be compared with a correct response for distinguishing the feedback based on the comparison. Optionally, the feedback may be distinguished using color-coding.

As yet another option, the group leader may be capable of selecting which of the individual group members to which to display the image stimulus.

As such, teachers and students benefit by having an enriched interaction that allows teachers to create a "snapshot" of student understanding that is more rich and full-featured than current solutions. Makers of teaching and learning hardware and software benefit by having a readily available assessment system which demonstrates the efficacy of their product.

DESCRIPTION OF THE PREFERRED EMBODIMENTS

Figure 1:
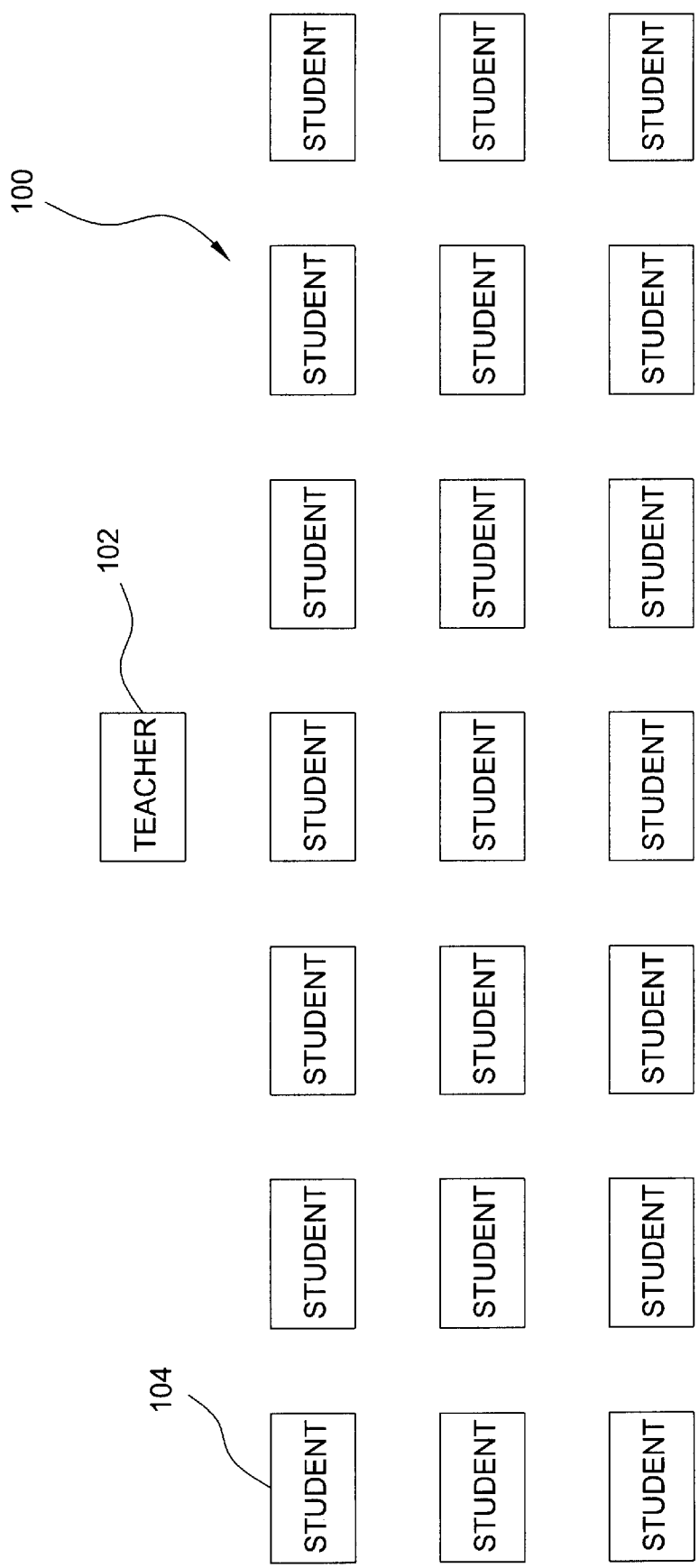
FIG. 1 illustrates one exemplary environment in which the present invention may be implemented.

FIG. 1 illustrates one exemplary environment in which the present invention may be implemented. As shown, an educational environment 100 may be provided with a plurality of students 104 and a teacher 102. It should be noted that any type of environment may be used where a plurality of users are formed in a group which is instructed, addressed, etc. by a head of the group. It should also be understood that the group of students 104 need not necessarily be congregated in a single location.

One exemplary embodiment involves the following system components:

- networked thin client devices, one for each group participant
- a computer or networked thin client device for the group leader
- a programming language that operates on the client devices
- a peer-to-peer directional communication capability between client devices
- a networked server computer
- a programming language that operates on the server
- a networking protocol through which the clients and server can send messages to each other, and optionally among clients
- a data description language in which the clients and server read and write messages for each other, and optionally among clients
- a display visible by the group leader and participants Descriptions for preferred and alternative embodiments are set forth for each component below; the overall assemblage can be realized in many different combinations without undue difficulty. In particular, alternative embodiments may utilize mixed kinds of devices, mixed kinds of program languages, mixed networking protocols, and mixed data description languages.

Figure 2:
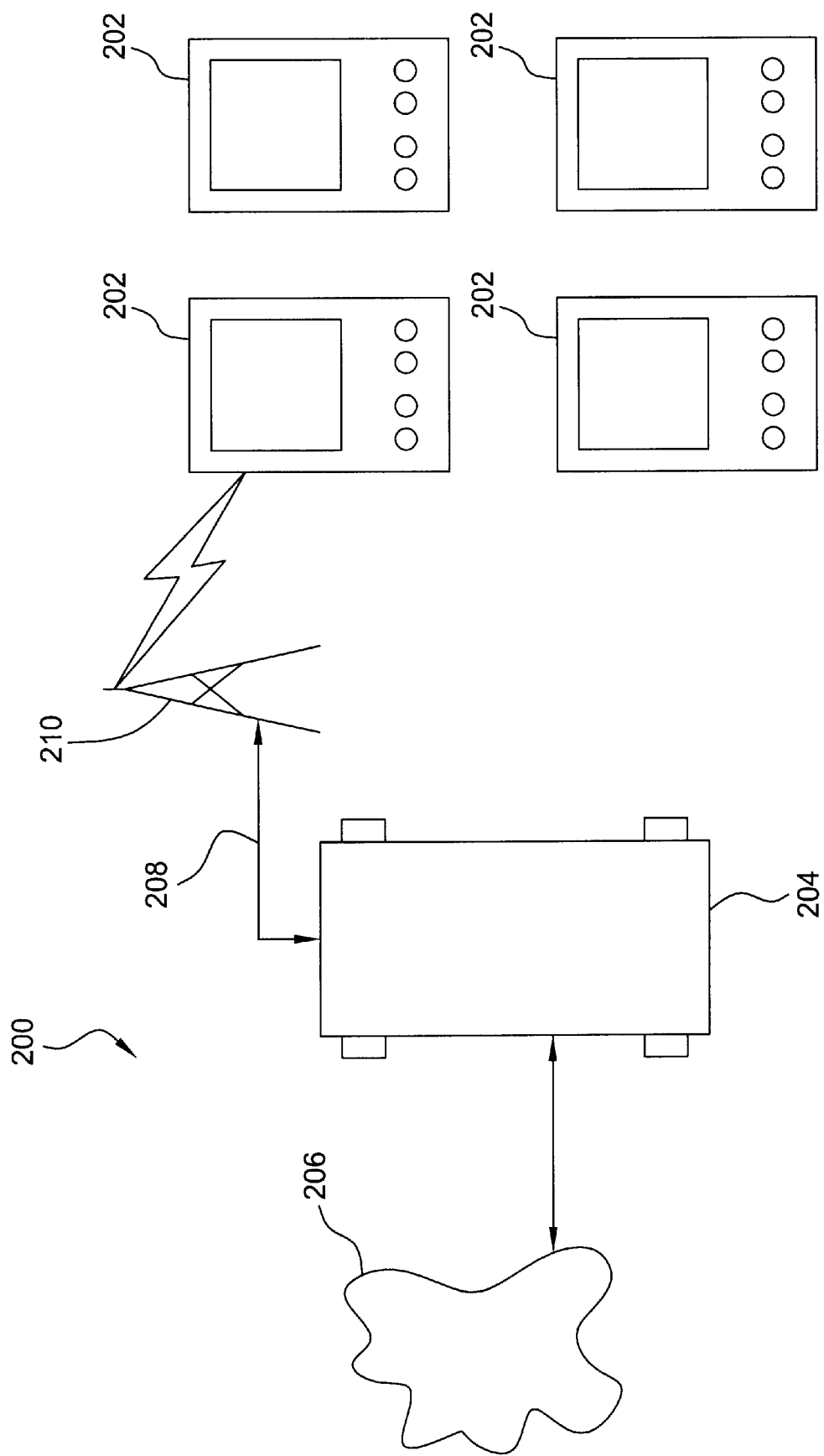
FIG. 2 depicts an exemplary operating environment including one or more thin client devices in connection with a host computer system.

FIG. 2 depicts an exemplary operating environment 200 including one or more thin client devices 202 in connection with a host computer system 204. In one embodiment, each of the students 104 may be equipped with one of the thin client devices 202, and the teacher 102 may be capable of using the host computer system 204. As an option, the teacher 102 may also interface with the host computer system 204 utilizing one of the thin client devices 202. The host computer system 204 may optionally be connected to remote sources of data information on the Internet 206. As an option, the thin client devices 202 may be wireless devices. In such embodiment, the host computer system 204 may include a peripheral interface adapter that provides for the bidirectional transfer of the data via an interconnect line 208 to a transceiver 210 that supports wireless communications with one or more wireless devices.

Figure 3:
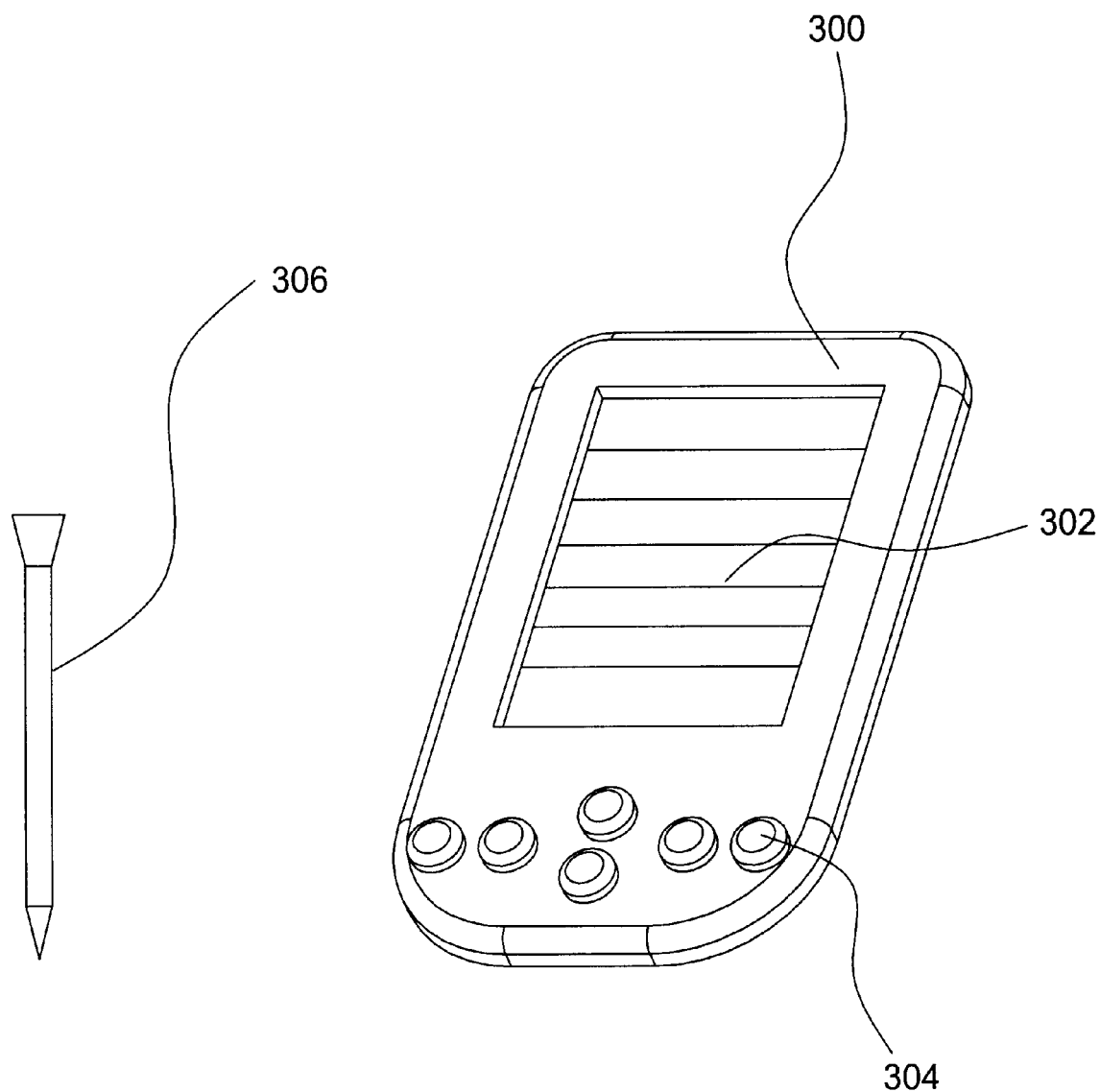
FIG. 3 illustrates an exemplary wireless thin client device.

In one embodiment, each networked thin client device is a handheld, palm-sized computer. FIG. 3 illustrates an exemplary wireless thin client device 300. Such wireless device 300 is preferably constructed with a plastic case housing a display panel 302, a keypad 304, and a stylus 306.

In the present description, use of the term "networked thin client device" it is meant to include a wide variety of personal computing devices with any one or more of various features. For example, such networked devices may have: (a) a means of graphic and textual output (b) a means of pixel-oriented spatial input and textual input and/or (c) a means of networking with other like devices and with a server. Optionally they devices may have a means of peer-to-peer communication with a single, appropriately equipped partner device. Embodiments could include but are not limited to: personal digital assistants, handheld gaming toys, cell phones, graphing calculators, tablet-based computers, and personal computers.

One preferred embodiment is battery powered; alternative embodiments can use any appropriate power source. One preferred device has a plastic or metal case; alternative embodiments can use any casing material appropriate for devices that will be handled by participants. One preferred device provides conveniences such as a cover for protecting the display and a contrast control; alternative embodiments might not have such conveniences, or many more conveniences might be provided. A variety of software can be run on one preferred devices, including address, datebook, to-do list and notebook applications, although none of these software applications are strictly required, and many more such applications could be used in conjunction with an alternative embodiment.

In one preferred embodiment the graphic and textual output is accomplished by means of a 160×160 pixel Liquid Crystal Display (LCD) screen, capable of displaying four levels of gray. In alternative embodiments, the screen may be larger or smaller, may be black and white only, or may display more levels of gray, or may display color. This screen may or may not have a backlight. In another alternative embodiment the screen could utilize a cathode ray tube (CRT) monitor. In another alternative embodiment the screen could consist of paper with ink droplets which can be caused to display or hide digitally, in a pixel array. As additional novel display technologies arise, little effort is foreseen to embody the invention, provided that the display is controllable by software in a manner similar to the control of today's pixel displays.

In one preferred embodiment, spatial and textual input is accomplished by use of a stylus, to write upon the stylus-sensitive LCD screen. The physical contact is recognized by operation system software on the client, and made available to client programming languages as logical input, such as entering text, drawing a line, or selecting a location on the screen. Optionally, buttons on the device can be used to indicate input. In the present embodiment, buttons are used for selecting a client application, and to indicate operations within the client program. Optionally, a keyboard may be attached to the device and used to produce input. In one alternative embodiment, input might be accomplished via audio input; voice recognition software could translate voice input into commands. In another alternative embodiment, spatial input may be accomplished via a physical pointing device such as a mouse, trackball, or joystick. In another alternative embodiment, one or more buttons might be used to indicate spatial positioning. In another alternative embodiment, eye gaze recognition might be used to accomplish spatial input. As additional novel input devices arise, little effort is foreseen to embody the invention, provided that the input is made available to client software in a similar manner as stylus, keyboard, or pointing input is made available to today's client software.

One preferred embodiment incorporates an infrared (IR) emitter and sensor, which enables the exchange of messages or data with a peer device (popularly called "beaming"). The peer device may be of a similar make and model as the first device, or may be another make or model of device supporting a similar IR emitter and sensor and a compatible communications protocol. In alternative embodiments, other methods of directional communication may be used, or beaming may not be supported by the device.

One preferred embodied also uses a networked thin client as the computer for the group leader. This networked thin client has the same characteristics listed above. In alternative embodiments, a desktop or laptop computer could be used for the group leader. In alternative embodiments, the server computer might be used directly by the group leader. In alternative embodiments, an infrared or radio frequency remote control might be used by the group leader to control the server. In alternative embodiments the teacher might control the server computer through voice commands. In alternative embodiments, the teacher might control the server computer by actions on a large flat markable display, such as a whiteboard, which has been instrumented so as to send commands to the server.

In one preferred embodiment, the ANSI C programming language is used to create client software on the thin client device, utilizing the operating system provided by the manufacturer on the device. The invention, however, does not require any features specific to ANSI C, and many other programming languages could be used. Object oriented programming is a popular technique. An alternative implementation could use an object-oriented language, such as C++ or Java. Alternative embodiments could also use interpreted languages, such as Basic, or JavaScript. On some devices, there is no support for languages other than assembly language (some models of Texas Instruments' graphing calculators are examples); alternative embodiments could be written in assembly language or machine code.

In one preferred embodiment, the textual program is compiled producing object code, the object code is transferred to the client, and the client code may then be executed. In an alternative embodiment, the textual program may be compiled to a machine-independent format, such as Java byte code. The machine-independent code may then be transferred to the client, and the client code may be executed using a special program that interprets byte code and produces the desired effects (such an interpreter is conventionally called a "virtual machine"). In alternative embodiments, the textual program may be transferred to the client without prior compilation, and executed via a program called an interpreter. An interpreter reads the program directly and produces the desired effect. Basic is an example of an interpreted language.

Alternative embodiments have been described using a variety of programming languages and means of executing programs written in those languages. Although programming languages differ in the means they afford for expression, and the means they offer for execution, different programming languages can be used to the produce the equivalent input/output and information processing behaviors. No particular difficulties are foreseen in deploying the invention in alternative embodiments using any programming language that can execute on the client device and produce equivalent input and output, and perform the requisite information processing steps.

Figure 4:
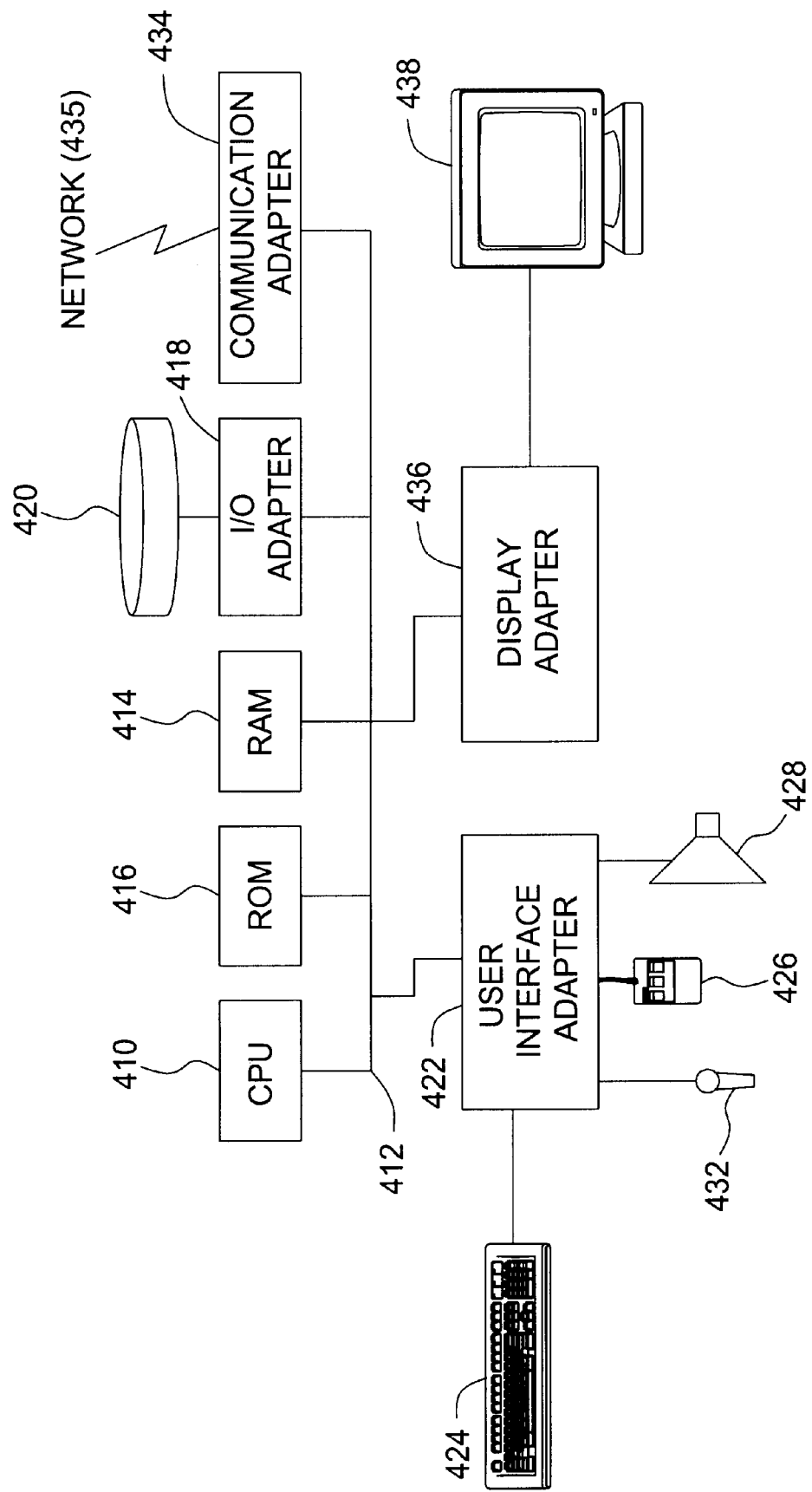
FIG. 4 shows a representative hardware environment associated with the host computer system of FIG. 2.

FIG. 4 shows a representative hardware environment associated with the host computer system of FIG. 2. Such figure illustrates a typical hardware configuration of a workstation in accordance with a preferred embodiment having a central processing unit 410, such as a microprocessor, and a number of other units interconnected via a system bus 412.

The workstation shown in FIG. 4 includes a Random Access Memory (RAM) 414, Read Only Memory (ROM) 416, an I/O adapter 418 for connecting peripheral devices such as disk storage units 420 to the bus 412, a user interface adapter 422 for connecting a keyboard 424, a mouse 426, a speaker 428, a microphone 432, and/or other user interface devices such as a touch screen (not shown) to the bus 412, communication adapter 434 for connecting the workstation to a communication network 435 (e.g., a data processing network) and a display adapter 436 for connecting the bus 412 to a display device 438.

In one preferred embodiment, the server computer is a stock Power Macintosh G4 with an 802.11b networking card installed. This server computer has a central processing unit, random access memory (RAM), read only memory (ROM), disk storage, Ethernet networking hardware and connectors, and capabilities for attaching input and output devices, principally a keyboard, mouse, and CRT monitor. The Power Macintosh G4 also has an antenna, card, and software support wireless networking via the IEEE 802.11b standard. The server computer has operating system software capable of executing server programs, which can intercommunicate with clients and other servers, and can access RAM, ROM, and disk storage. Alternative embodiments could use other computer hardware. A wide variety of processing chips might be used, including Pentium, SPARC, ARM, Crusoe, or other processing chips. More than one processing chip might be used in the same server. A wide variety of storage devices might be used. In alternative embodiments storage might reside on devices outside the main computer box, connected by dedicated wiring, or by general-purpose networking. In alternative servers, other physical networking layers might be supported, as will be discussed below. In alternative embodiments other operating systems might be used, such as Linux, Solaris, Window95, Window98, Windows NT, or Windows 2000. In alternative embodiments, a coordinated collection of computers might collectively act as the server. In alternative embodiments, the server might be a network appliance, with no provision for input and output devices, other than a connection to a network. In alternative embodiments, the server might also reside on a client device, with one client acting as server, or acting as both client and server. As described immediately below, there are many alternative networking embodiments. An alternative server embodiment may not have an Ethernet card and connector, but would only have the networking hardware and connectors used for its specific networking option. Likewise, if 802.11b is not the networking embodiment used, the server might not have an 802.11b card and antenna.

One preferred embodiment uses Java as the programming language on the server. In particular, the Servlet Application Programmer Interface (API) is used to write server programs. Textual server programs are compiled into Java byte code. A virtual machine executes this byte code. One preferred embodiment utilizes a Java web server program within which the program executes. In alternative embodiments the Java program could be executed in conjunction with other web server programs, such as Apache, Netscape, or Microsoft web servers. The discussion of alternative program languages presented with regard to client program also pertains to server programming. A wide variety of program languages and means of executing programs offer equivalent capabilities. Alternative embodiments could thus be constructed many different programming languages and execution facilities. A list of possible languages, which is by no means exclusive, includes C, C++, Python, Perl, Active Server Pages, Java Server Pages, JavaScript and Basic.

Networking is generally conceived of in terms of layers; although 7 or more layers are commonly used, the present discussion will be simplified to three layers: physical, transport, and application.

One preferred embodiment uses a combination of infrared (IR) beaming and Ethernet cabling as physical layer. Alternative embodiments of the physical layer could use radio frequency (RF) communication in the 900 megahertz, 2.4 Gigahertz, or other spectrums, as an alternative to IR. Alternative embodiments could also use wired connections to a partner device (such as a cell phone) which is then connected to the network. It is the nature of internet protocols to allow many combinations of physical topology and infrastructure to interoperate, and thus endless combinatorics prevent us from listing all possible alternative embodiments of the physical layer. At any rate, any physical layer will suffice as long as it connects the devices and allows a suitable network protocol to be used to exchange information among them.

One preferred embodiment uses TCP/IP for the middle transport layers. For IR communication Point to Point Protocol (PPP) is used over irDA to make a TCP/IP connection to a wired Ethernet switch, which then provides TCP/IP connectivity to the rest of the wired network. One preferred embodiment runs TCP/IP over PPP over irDA. Alternative embodiments could use TCP/IP over Bluetooth, 802.11, or HomeRF standards. An alternative embodiment could substitute AppleTalk, a newer version of TCP/IP or another transport protocol for the present use of TCP/IP. Transports are generally equivalent, for the purposes herein, provided they can deliver messages between the two addressable devices in a timely and reasonably dependable fashion, and those messages can support an application protocol such as HTTP and data such as XML.

Sockets are used at the application layer, using a custom protocol for communication. This protocol is a simplified version of the HyperText Transport Protocol (http), and allows for requesting information from the server via GET operations and sending information to the server via POST operations. A secondary socket channel is also used to send change notification messages from server to client. The protocol for this channel consists of POSTing a "changed" message with optional timestamp information, as well as an optional indication as to what changed. An alternative embodiment could use the Object Exchange protocol (OBEX). Another alternative embodiment could use HTTP 1.0 or greater; many programming languages contain libraries or classes that directly support these protocols without direct reference to sockets. Little difficulty is foreseen in using alternative logical representations of a communications channel between devices, so long as it provides read and write operations that receive and send structured textual and/or binary data between addressable devices, along the lines of the http get and post messages.

One preferred embodiment uses a simplified form of the extensible markup language (XML) for structuring the data messages which are exchanged among clients and the server. An alternative embodiment could use HTML. An alternative embodiment could use a binary message format that contains equivalent information. An alternative embodiment could use XML without simplification. An alternative embodiment could use another structured text description language, so long as matching encoders and decoders can be written for both sides of the communication channel.

One preferred embodiment includes a public display, visible by the group leader and group participants. A computer projector is used to cast this image upon a reflective, flat surface at the front of the room. In alternative embodiments, a wide variety of projection technologies could be used. The projection could be from in front of or behind the screen. The projection unit might contain a light source, or rely upon an external light source. In alternative embodiments, the large public display might be large CRT monitor or LCD display. In alternative embodiments, participants may not be in the same room, and the "public" display may be a display area reserved for this purpose on their remote computer or device. In general, any device may serve as the public display as long as (1) it can display computer graphics images (2) the computer graphics images can be controlled by a computer, such as the server or the group leader's computer, (3) all participants can see it when required by the group activity to do so.

Figure 5:
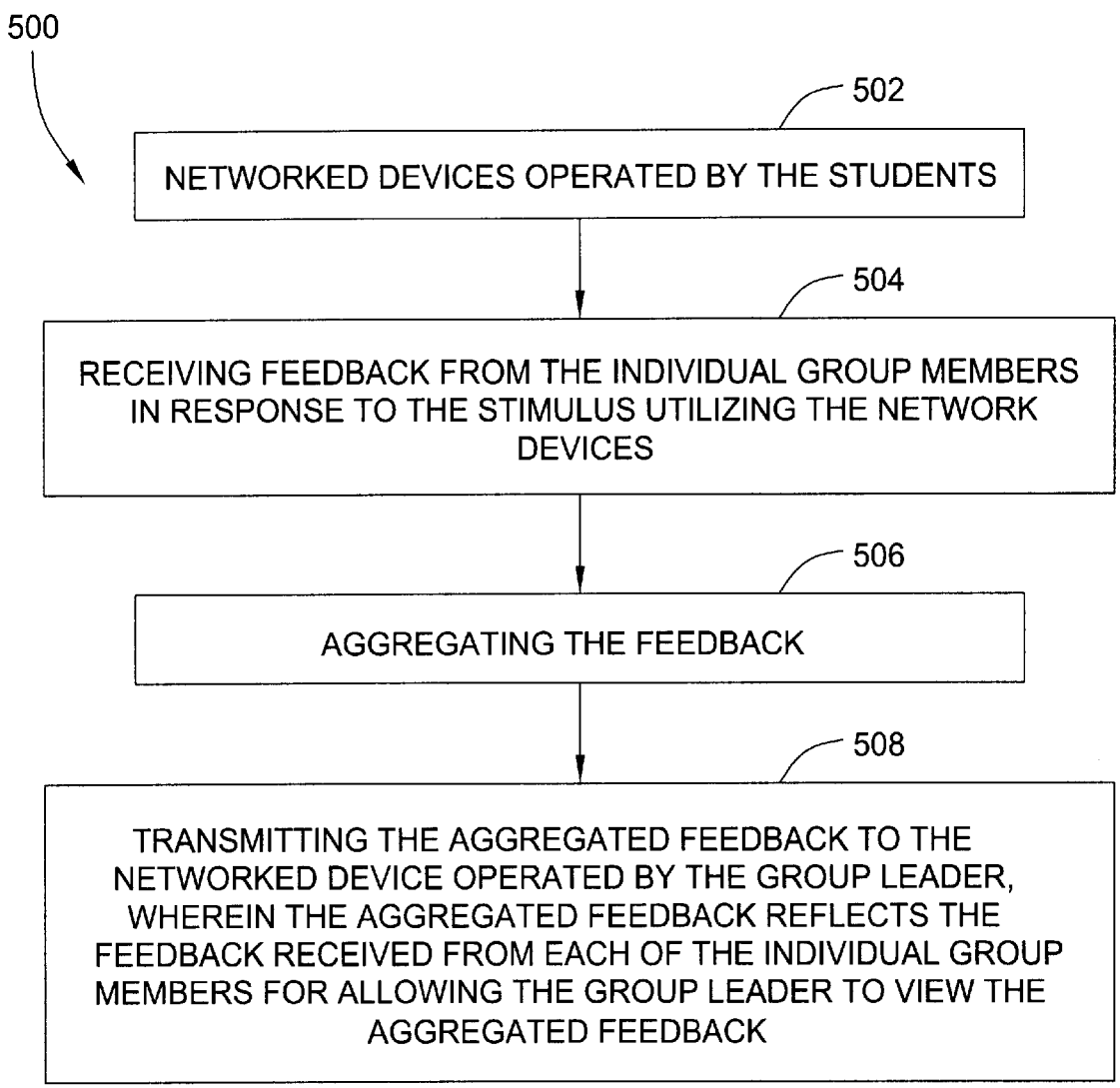
FIG. 5 illustrates a method for giving feedback in an educational environment using networked devices.

FIG. 5 illustrates a method 500 for giving feedback in an educational environment using networked devices, in accordance with one embodiment of the present invention. As an option, the networked devices may include thin client devices.

Further, such thin client devices may include wireless devices. Still yet, the wireless devices may include handheld wireless devices such as personal digital assistants (PDAs) each including a stylus, as set forth hereinabove during reference to FIGS. 2 and 3. It should be noted, however, that any type of networked device may be employed per the desires of the user.

Initially, in operation 502, an image stimulus is displayed to a plurality of individual group members regarding material being presented by a group leader utilizing a plurality of networked devices operated by the group members. The image stimulus maybe displayed to each of the group members, or just to a select number thereof. As an option, the group leader may be capable of selecting which of the individual group members to which to display the image stimulus. Further, the image stimulus may be personalized for different students. Still yet, the image stimulus may be displayed to a random number of students.

In a classroom environment, the group members may include students, and the group leader may include a teacher. It should be noted, however, that the present invention may be employed in any desired environment.

The image stimulus may include any visual material that is being used for educational purposes. For example, the visual material may be a 2-dimension image, such as a map or diagram. Or, in another example, the visual material may be a 3-dimension image, such as a globe. In still another example, the image stimulus may include, but is not limited to a plurality of sequentially displayed frames of images, i.e. a movie, during which real-time feedback may be provided. In still other environments, a laptop computer with LCD projector may be employed.

Content of the image stimulus may vary widely based on the material presented by the teacher. Specific instances of use might include:

Displaying a map of the United States, and asking students to mark the regions with the highest annual rainfall (geography class);

Displaying a schematic of a circuit, and asking class to mark where they would place a voltmeter probe to measure to test for a particular fault;

Displaying a Cartesian graph, and asking students to sketch a particular mathematical function.

Displaying a famous painting, and asking students to select a region of the image to highlight the artists use of a particular visual effect.

Displaying an image from Gray's anatomy, and asking students to mark the location of a particular muscle.

Displaying a 3-D rendering of a molecule, and asking students to mark a hydrogen atom.

In still another embodiment, the image stimulus includes information associated with a reference coordinate system for use in describing the position of the feedback, as will soon become apparent. Further, the networked devices may be capable of changing a view of the image stimulus by performing a control operation selected from the group consisting of scrolling, zooming, rotating, filtering, and processing.

As an option, the image stimulus may include an image corresponding to a model of one or more spatial objects and interactions among the spatial objects. Moreover, the image may change over time according to either rules or input.

The image stimulus may be displayed to the group members utilizing a projector. Further, the image stimulus may be displayed to the group leader on a networked device visible to the group leader.

After the image stimulus is presented, feedback is received from the individual group members utilizing the networked devices. Note operation 504. Such feedback may include any type of input provided by the group members on the networked devices. Examples of such feedback will be set forth hereinafter in greater detail.

As an option, the feedback may be received from the individual group members only after the feedback is entered by the individual group members, and the feedback is subsequently authorized for transmission. In particular, a prompt may be displayed to the user for allowing a user to review his or her feedback before submitting the same. In one example, an SEND button may be provided for such purpose.

In one embodiment of the present invention, each feedback may include at least one point, shape, or region selected by at least one of the individual group members. Moreover, the feedback may include textual input provided by at least one of the individual group members. Still yet, the feedback and information pertaining to the feedback may be displayed to the individual group members utilizing the networked devices. Such feedback and information may also be transmitted to the server computer.

The feedback may also include attributes selected by the individual group members in conjunction with the feedback. Such attributes may include color, geometric information, textual information, audible information, visual information, etc.

In still another embodiment, the individual group members may each be capable of contributing more than one instance of feedback. Optionally, each instance of feedback may be assigned a unique identifier. As such, the individual group members are capable of deleting or modifying a previous instance of feedback by communicating with the server computer, using the unique identifier. Moreover, the individual group members are capable of deleting, modifying, or adding attributes associated with a previous instance of feedback by communicating with the server computer, using the unique identifier. As an option, the group leader may determine allowable attributes associated with the feedback.

Further, the group leader may be capable of requiring the group members to select specific attribute types or values with the feedback. The server computer may communicate information relating to the allowable attributes to the networked devices, and the network devices may automatically limit the feedback in accordance with the information. Further, the server computer may communicate upon the feedback no being allowable such that the associated networked device can inform the group member that the feedback was disallowed.

In still another embodiment of the present invention, the image stimulus may include information associated with a reference coordinate system for use in describing the position of the feedback.

As yet another enhancement, the feedback may include information identifying the group member associated therewith. Further, such information may also include connection or session information. Optionally, the feedback may be assigned a date and time when the feedback is the subject of an action selected from the group consisting of received, created, and last modified.

The feedback is then aggregated in operation 506, after which the aggregated feedback is transmitted to the networked device operated by the group leader. See operation 508. Such aggregated feedback may reflect the feedback received from each of the individual group members for allowing the group leader to view the aggregated feedback.

The feedback may be any form of a 2 or 3-dimensional visual display. In one embodiment, the form of the visual display is visually analogous to the form in which results will be displayed and aggregated. More information regarding such feature will be set forth in greater detail in FIGS. 6A and 6B.

In still another embodiment of the present invention, the group leader may be allowed to select at least one of a plurality of summary types. The feedback may thus be aggregated based on the selected summary type. Summary types may vary. For example, a group leader may choose between a graph, an analogous display, a clustering display of the students based on their responses, etc. Further, the feedback may be compared with a correct response for distinguishing the feedback based on the comparison. Optionally, the feedback may be distinguished using color-coding. For example, all correct answers may be displayed in a first color, and all wrong answers may be displayed in a second color. In each instance, the system instantly aggregates student responses and displays the result in the summary representation.

As an option, the aggregated feedback may maintain the identity of the individual group members secret. On the other hand, the identity may also be disclosed using color coding, identifiers, etc. As an option, the group members may be divided into sub-groups which may be uniquely identified.

While the teacher may best use the aggregated feedback, such feedback may also be made available to others. For example, it may be transmitted to the networked devices operated by the individual group members. In yet another embodiment, the aggregated feedback may be stored for display utilizing the Internet. This may be done for allowing other interested members to review the feedback. In a children classroom setting, such functionality would allow parents to monitor progress of their children.

In yet another embodiment of the present invention, the aggregation step may include multiple operations, where each operation is executed based on an output of a previous operation. As such, the aggregation step may produce multiple outputs each associated with one of the operations. This may be done without affecting a state of other operations.

The multiple outputs may be sorted and filtered utilizing criteria associated with the feedback. As an option, a copy of the multiple outputs may be stored before being used for other operations. Such operations may include changing feedback, adding feedback, removing feedback, and/or modifying attributes associated with the feedback. Still yet, the operations may be capable of generating information relating to a correctness of the feedback.

As an option, the feedback may be aggregated into a form similar to that associated with the image stimulus. Further, the aggregation may indicate the variability in spatial reference present in the original feedback.

The variability in spatial reference present in the original feedback may also be reduced by treating the feedback which is spatially related as being the same. This is accomplished by treating feedback which falls within predetermined regions as being the same. In a similar embodiment, related feedback may be displayed as an object a size of which is proportional to an amount of related feedback. As such, related feedback may be displayed as a stacked series of the objects with each object representing the feedback of one of the group members.

To further enhance the output of the aggregation of the feedback, the aggregated feedback may be displayed in a foreground and the image stimulus displaced in a background. Such background may be displaced with respect to the foreground utilizing effects such as layering, adjusting transparency, and/or modifying color.

The user may modify a perspective of the aggregated feedback by performing a control operation such as scrolling, zooming, rotating, filtering, and/or processing. As an additional option, sounds may be emitted and textual information may be displayed upon receipt of the feedback.

Figure 6A:
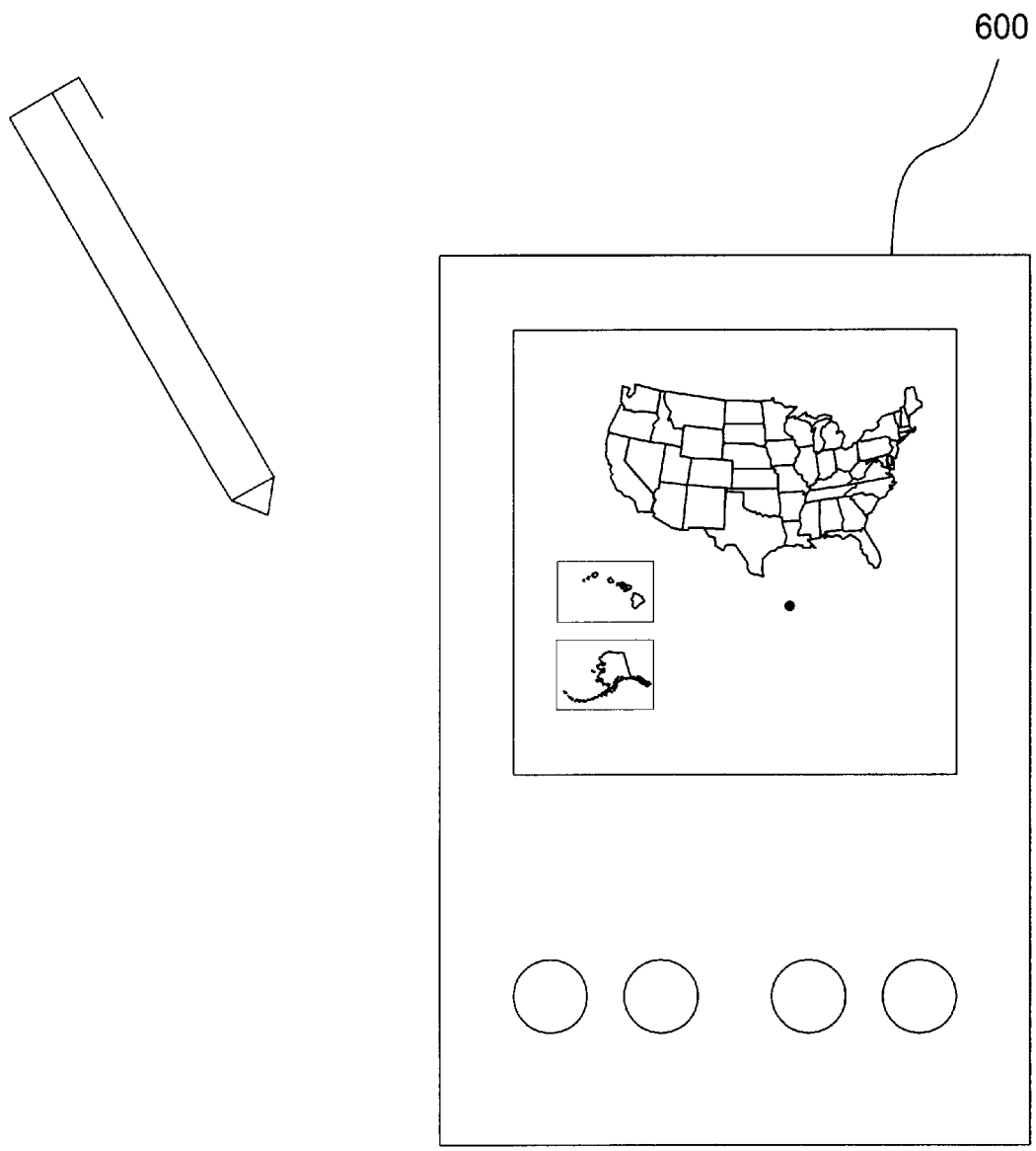
FIGS. 6A and 6B illustrate one example of use of the present invention.
Figure 6B:
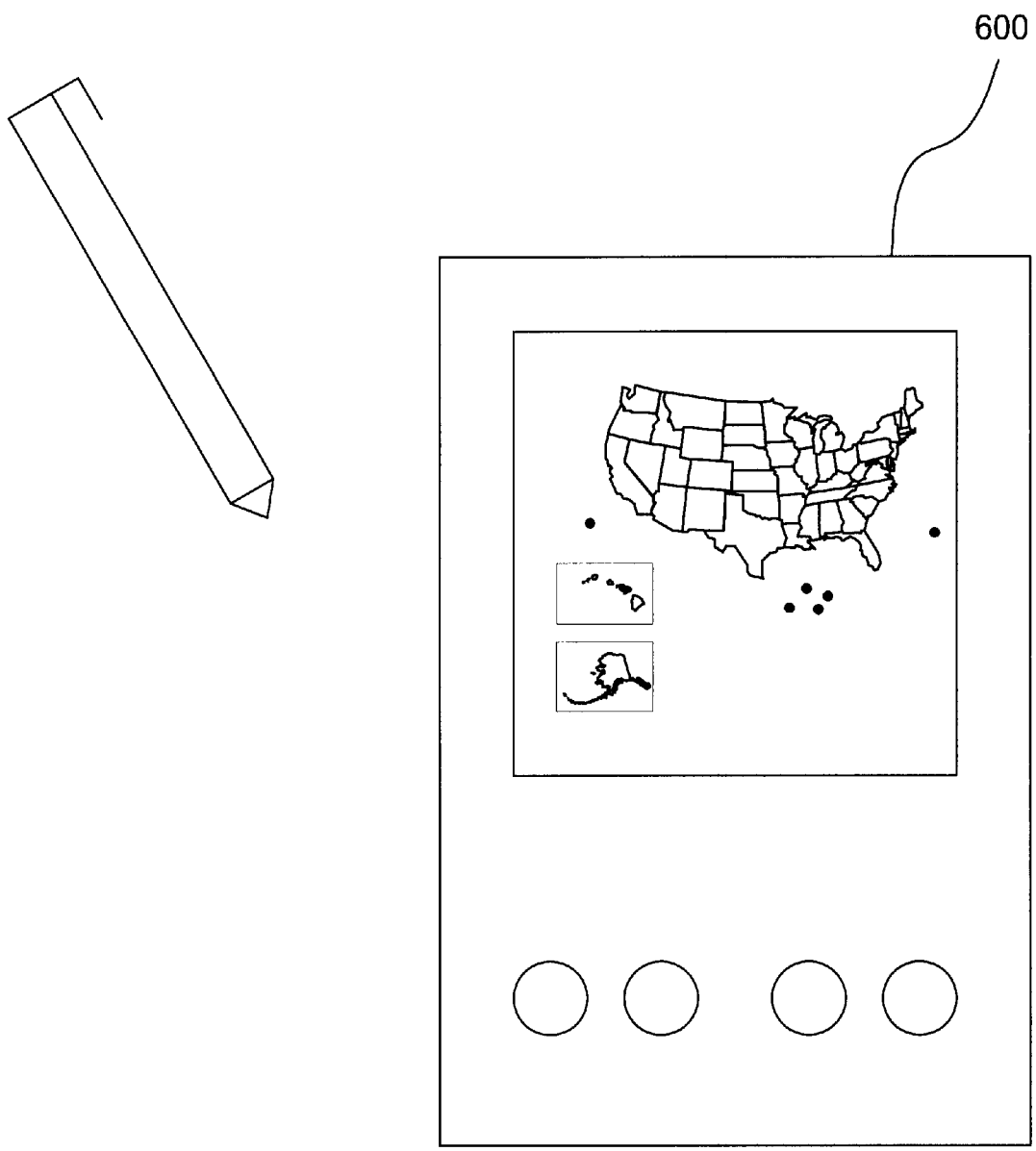

FIGS. 6A and 6B illustrate one example of use of the present invention. In operation, the students are able to mark their individual response on their personal device by placing a mark spatially on the representation. See screen 600 of FIG. 6A. In the present scenario, each student may mark where they think the Gulf of Mexico is located.

The resulting student marks are aggregated and redisplayed to the classroom in a "summary" representation. See screen 610 of FIG. 6B. This allows a teacher to quickly see if all students are "in the same place" or if there are some differences of opinion or outliers. As an option, the students themselves may analyze the aggregation. Because the students make their individual marks in a representation analogous to the one used in the aggregate, they can self-identify whether they had a similar or different response from their classmates.

The present invention thus specifically targets kinds of displays of understanding which are hard to indicate verbally, or with a quick gesture. Because their mark appears in the summary representation in a fashion analogous to how it looks on their individual display, it is easy for students to self-identify their own response and compare it to the aggregate.

The present invention is further quite generic across learning topics, and because it relies primarily on images, could be compatible with many types of application-specific software which can render and mark images. By building such assessment expertise into such a generic capability, the present invention offers $3^{rd}$ parties a way to increase the value of their systems.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for giving feedback using networked devices, comprising the steps of:

(a) displaying an image stimulus to a plurality of group members by a group leader utilizing the plurality of networked devices operated by the group members;

(b) receiving feedback from at least two of the group members in response to the image stimulus utilizing the networked devices, wherein said feedback comprises a response that reflects a spatial reference that is placed on said image stimulus;

(c) aggregating the feedback from said at least two of the group members; and (d) transmitting the aggregated feedback to the group leader, wherein the aggregated feedback reflects a composite of said spatial references to said image stimulus.

2. The method as recited in claim 1, wherein the networked devices include thin client devices.

3. The method as recited in claim 2, wherein the thin client devices include wireless devices.

4. The method as recited in claim 3, wherein the wireless devices include handheld wireless devices.

5. The method as recited in claim 4, wherein the wireless devices include personal digital assistants (PDAs).

6. The method as recited in claim 1, wherein the image stimulus is a two dimensional image.

7. The method as recited in claim 1, wherein the image stimulus is a three dimensional image.

8. The method as recited in claim 1, wherein the image stimulus is a sequence of images in the form of a movie.

9. The method as recited in claim 1, wherein the image stimulus includes information associated with a reference coordinate system for use in describing the position of the feedback.

10. The method as recited in claim 1, wherein the image stimulus is an image corresponding to a model of one or more spatial objects.

11. The method as recited in claim 10, wherein the image stimulus is an image corresponding to a model of one or more spatial objects and interactions among the spatial objects.

12. The method as recited in claim 11, wherein the image changes over time according to at least one of rules and input.

13. The method as recited in claim 1, wherein the image stimulus is displayed to the group members utilizing a projector.

14. The method as recited in claim 1, wherein the image stimulus is displayed to the group leader on a networked device visible to the group leader.

15. The method as recited in claim 1, wherein the feedback includes at least one point selected by at least one of the group members.

16. The method as recited in claim 1, wherein the feedback includes at least one shape selected by at least one of the group members.

17. The method as recited in claim 1, wherein the feedback includes at least one region selected by at least one of the group members.

18. The method as recited in claim 1, wherein the feedback includes textual input provided by at least one of the group members.

19. The method as recited in claim 1, wherein the feedback and information pertaining to the feedback is displayed to the group members utilizing the networked devices, and transmitted to a server computer.

20. The method as recited in claim 1, wherein the feedback includes attributes selected by the group members in conjunction with the feedback.

21. The method as recited in claim 20, wherein the attributes include color.

22. The method as recited in claim 20, wherein the attributes include geometric information.

23. The method as recited in claim 20, wherein the attributes include textual information.

24. The method as recited in claim 20, wherein the attributes include audible information.

25. The method as recited in claim 20, wherein the attributes include visual information.

26. The method as recited in claim 1, wherein each group member is capable of contributing more than one instance of feedback.

27. The method as recited in claim 26, wherein each instance of feedback is assigned a unique identifier.

28. The method as recited in claim 27, wherein the group members are capable of deleting or modifying a previous instance of feedback by communicating with a server computer, using the unique identifier.

29. The method as recited in claim 27, wherein the group members are capable of deleting, modifying, or adding attributes from a previous instance of feedback by communicating with a server computer, using the unique identifier.

30. The method as recited in claim 1, wherein allowable attributes associated with the feedback are determined by the group leader.

31. The method as recited in claim 30, wherein the group leader is capable of requiring the group members to select specific attribute types or values with the feedback.

32. The method as recited in claim 30, wherein a server communicates information relating to the allowable attributes to the networked devices, and the network devices limit the feedback in accordance with the information.

33. The method as recited in claim 30, wherein a server communicates upon the feedback being not allowable.

34. The method as recited in claim 33, wherein the corresponding networked device is capable of informing the associated group member that the feedback is disallowed.

35. The method as recited in claim 1, wherein the networked devices are capable of changing a view of the image stimulus by performing a control operation selected from the group consisting of scrolling, zooming, rotating, filtering, and processing.

36. The method as recited in claim 35, wherein the image stimulus includes information associated with a reference coordinate system for use in describing the position of the feedback, wherein the control operation utilizes the information.

37. The method as recited in claim 35, wherein one or more attributes are added to the feedback for indicating the control operation.

38. The method as recited in claim 1, wherein the feedback includes information identifying the group member associated therewith.

39. The method as recited in claim 38, wherein the information includes session information.

40. The method as recited in claim 38, wherein the information includes connection information.

41. The method as recited in claim 1, wherein the feedback is assigned a date and time when the feedback is the subject of an action selected from the group consisting of received, created, and last modified.

42. The method as recited in claim 1, wherein the group leader can control the aggregation step.

43. The method as recited in claim 1, wherein the aggregation step includes multiple operations, where each operation is executed based on an output of a previous operation.

44. The method as recited in claim 43, wherein the aggregation step produces multiple outputs each associated with one of the operations, where each operation does not affect a state of other operations.

45. The method as recited in claim 44, wherein the multiple outputs are filtered utilizing criteria associated with the feedback.

46. The method as recited in claim 44, wherein the multiple outputs are sorted utilizing criteria associated with the feedback.

47. The method as recited in claim 44, wherein a copy of the multiple outputs is stored before being used for other operations.

48. The method as recited in claim 43, wherein the operations are selected from the group consisting of changing feedback, adding feedback, removing feedback, and modifying attributes associated with the feedback.

49. The method as recited in claim 43, wherein the operations generate information relating to a correctness of the feedback.

50. The method as recited in claim 1, wherein the feedback is aggregated into a form similar to that associated with the image stimulus.

51. The method as recited in claim 50, wherein the aggregation indicates the variability in spatial reference present in the original feedback.

52. The method as recited in claim 50, wherein the aggregation reduces the variability in spatial reference present in the original feedback by treating the feedback which is spatially related as being the same.

53. The method as recited in claim 52, wherein the feedback which falls within predetermined regions are treated as being the same.

54. The method as recited in claim 52, wherein related feedback is displayed as an object a size of which is proportional to an amount of related feedback.

55. The method as recited in claim 54, wherein related feedback is displayed as a stacked series of the objects with each object representing the feedback of one of the group members.

56. The method as recited in claim 1, wherein the aggregated feedback is accompanied by the image stimulus.

57. The method as recited in claim 56, wherein the aggregated feedback is displayed in a foreground and the image stimulus is displaced in a background.

58. The method as recited in claim 57, wherein the aggregated feedback is displayed in a foreground and the image stimulus is displaced in a background utilizing effects selected from the group consisting of layering, adjusting transparency, and modifying color.

59. The method as recited in claim 1, wherein the networked devices are capable of changing a view of the aggregated feedback by performing a control operation selected from the group consisting of scrolling, zooming, rotating, filtering, and processing.

60. The method as recited in claim 1, wherein sounds are emitted upon receipt of the feedback.

61. The method as recited in claim 1, wherein textual information is displayed upon receipt of the feedback.

62. The method as recited in claim 1, wherein the aggregated feedback maintains the identity of the group members secret.

63. The method as recited in claim 1, wherein the aggregated feedback is transmitted to the networked devices operated by the group members.

64. The method as recited in claim 1, wherein the aggregated feedback is received by the group members only after the group leader gives authorization.

65. The method as recited in claim 1, wherein the aggregated feedback is received by the group members only after a predetermined criterion is met.

66. The method as recited in claim 65, wherein the criteria is selected from the group consisting of every group member having transmitted feedback, a duration of time having elapsed, and at least two group members have given correct feedback.

67. The method as recited in claim 1, wherein the aggregated feedback includes a plurality of sequentially displayed frames of images.

68. The method as recited in claim 1, and further comprising the step of storing the aggregated feedback for utilization with the Internet.

69. The method as recited in claim 1, and further comprising the step of allowing the group leader to select at least one of a plurality of output types, wherein the feedback is aggregated based on the selected output type.

70. The method as recited in claim 1, wherein the group leader is capable of selecting which of the group members to which to display the image stimulus.

71. A computer-readable medium having stored thereon a plurality of instructions, the plurality of instructions including instructions which, when executed by a processor, cause the processor to perform the steps comprising of:
   (a) displaying an image stimulus to a plurality of group members by a group leader utilizing the plurality of networked devices operated by the group members;
   (b) receiving feedback from at least two of the group members in response to the image stimulus utilizing the networked devices, wherein said feedback comprises a response that reflects a spatial reference that is placed on said image stimulus;
   (c) aggregating the feedback from said at least two of the group members; and
   (d) transmitting the aggregated feedback to the group leader, wherein the aggregated feedback reflects a composite of said spatial references to said image stimulus.

72. A system for giving feedback using networked devices, comprising:
   (a) circuit logic for displaying an image stimulus to a plurality of group members by a group leader utilizing the plurality of networked devices operated by the group members;
   (b) circuit logic for receiving feedback from at least two of the group members in response to the image stimulus utilizing the networked devices, wherein said feedback comprises a response that reflects a spatial reference that is placed on said image stimulus;
   (c) circuit logic for aggregating the feedback from said at least two of the group members; and
   (d) circuit logic for transmitting the aggregated feedback to the group leader, wherein the aggregated feedback reflects a composite of said spatial references to said image stimulus.

73. A method for soliciting, receiving, aggregating and viewing feedback using networked devices, comprising the steps of:
   (a) enabling a group leader to select an image stimulus to be presented to a plurality of group members utilizing one of said networked devices operated by the group leader,
   (b) communicating the image stimulus or a description thereof to a server computer, end thereafter to the plurality of networked devices operated by said group members such that the group members are capable of viewing the image stimulus on the networked devices;
   (c) enabling at least two of the group members to create a response, where the response includes one or more spatial references that are placed on the image stimulus;
   (d) communicating at least two of the responses from the networked devices to the server computer;
   (e) aggregating the received responses on the server computer and composing the responses into one or more unified output objects; and
   (f) making the one or more unified output objects available for transmission from the server computer to one or more of the networked devices in a form suitable for display on the networked devices, wherein the aggregated responses are viewable by the group leader and the group members.

74. A method for giving feedback in an educational environment using networked devices, comprising the steps of:
   (a) displaying an image stimulus to a plurality of individual group members regarding material being presented by a group leader utilizing the plurality of networked devices operated by the group members, wherein the image stimulus is an image corresponding to a model of one or more spatial objects and interactions among the spatial objects and wherein the image stimulus changes over time according to at least one of rules and input;
   (b) receiving feedback from the individual group members in response to the image stimulus utilizing the networked devices, wherein said feedback comprises a response that reflects a spatial reference that is placed on said image stimulus;
   (c) aggregating the feedback; and
   (d) transmitting the aggregated feedback to one of said networked devices operated by the group leader, wherein the aggregated feedback reflects the feedback received from each of the individual group members for allowing the group leader to view the aggregated feedback.

75. A method for giving feedback in an educational environment using networked devices, comprising the steps of:
   (a) displaying an image stimulus to a plurality of individual group members regarding material being presented by a group leader utilizing the plurality of networked devices operated by the group members;
   (b) receiving feedback from the individual group members in response to the image stimulus utilizing the networked devices, wherein each individual group member is capable of contributing more than one instance of feedback, wherein each instance of feedback is assigned a unique identifier, and wherein the individual group members are capable of deleting or modifying a previous instance of feedback by communicating with a server computer by using the unique identifier;
   (c) aggregating the feedback; and
   (d) transmitting the aggregated feedback to one of said networked devices operated by the group leader, wherein the aggregated feedback reflects the feedback received from each of the individual group members for allowing the group leader to view the aggregated feedback.

76. A method for giving feedback in an educational environment using networked devices, comprising the steps of:

(a) displaying an image stimulus to a plurality of individual group members regarding material being presented by a group leader utilizing the plurality of networked devices operated by the group members;

(b) receiving feedback from the individual group members in response to the image stimulus utilizing the networked devices, wherein each individual group member is capable of contributing more than one instance of feedback, wherein each instance of feedback is assigned a unique identifier, and wherein the individual group members are capable of deleting, modifying, or adding attributes from a previous instance of feedback by communicating with a server computer by using the unique identifier;

(c) aggregating the feedback; and (d) transmitting the aggregated feedback to one of said networked devices operated by the group leader, wherein the aggregated feedback reflects the feedback received from each of the individual group members for allowing the group leader to view the aggregated feedback.

77. A method for giving feedback in an educational environment using networked devices, comprising the steps of:

(a) displaying an image stimulus to a plurality of individual group members regarding material being presented by a group leader utilizing the plurality of networked devices operated by the group members;

(b) receiving feedback from the individual group members in response to the image stimulus utilizing the networked devices, wherein said feedback comprises a response that reflects a spatial reference that is placed on said image stimulus;

(c) aggregating the feedback, wherein the feedback is aggregated, and wherein the aggregation indicates a variability in spatial reference present in the original feedback; and (d) transmitting the aggregated feedback to one of said networked devices operated by the group leader, wherein the aggregated feedback reflects the feedback received from each of the individual group members for allowing the group leader to view the aggregated feedback.

78. A method for giving feedback in an educational environment using networked devices, comprising the steps of:

(a) displaying an image stimulus to a plurality of individual group members regarding material being presented by a group leader utilizing the plurality of networked devices operated by the group members;

(b) receiving feedback from the individual group members in response to the image stimulus utilizing the networked devices, wherein said feedback comprises a response that reflects a spatial reference that is placed on said image stimulus;

(c) aggregating the feedback, wherein the feedback is aggregated into a form similar to that associated with the image stimulus, and wherein the aggregation reduces a variability in spatial reference present in the original feedback by treating the feedback which is spatially related as being the same; and (d) transmitting the aggregated feedback to one of said networked devices operated by the group leader, wherein the aggregated feedback reflects the feedback received from each of the individual group members for allowing the group leader to view the aggregated feedback.

79. The method as recited in claim 78, wherein the feedback which falls within a plurality of predetermined regions are treated as being the same.

80. The method as recited in claim 78, wherein related feedback is displayed as an object having a size of which is proportional to an amount of related feedback.

81. The method as recited in claim 80, wherein related feedback is displayed as a stacked series of the objects with each object representing the feedback of one of the group members.

82. A method for giving feedback in an educational environment using networked devices, comprising the steps of:

(a) displaying an image stimulus to a plurality of individual group members regarding material being presented by a group leader utilizing the plurality of networked devices operated by the group members;

(b) receiving feedback from the individual group members in response to the image stimulus utilizing the networked devices, wherein said feedback comprises a response that reflects a spatial reference that is placed on said image stimulus;

(c) aggregating the feedback, wherein the aggregated feedback is accompanied by the image stimulus, and wherein the aggregated feedback is displayed in a foreground and the image stimulus is displaced in a background; and (d) transmitting the aggregated feedback to one of said networked devices operated by the group leader, wherein the aggregated feedback reflects the feedback received from each of the individual group members for allowing the group leader to view the aggregated feedback.

83. The method as recited in claim 82, wherein the aggregated feedback is displayed in said foreground and the image stimulus is displaced in said background utilizing effects selected from the group consisting of layering, adjusting transparency, and modifying color.

* * * * *

UNITED STATES PATENT AND TRADEMARK OFFICE
CERTIFICATE OF CORRECTION

PATENT NO. : 6,628,918 B2
DATED : September 30, 2003
INVENTOR(S) : Roschelle et al.

It is certified that error appears in the above-identified patent and that said Letters Patent is hereby corrected as shown below:

Title page,
Item [75], Inventors, please change "Fronderville" to -- Frondeville --.

Signed and Sealed this

Twenty-fifth Day of November, 2003

JAMES E. ROGAN
*Director of the United States Patent and Trademark Office*